June 16, 1959 L. E. MARTIN 2,890,901
END THRUST BEARING SEAL
Filed Sept. 24, 1956

INVENTOR.
Leslie E. Martin
BY Ramsey and Kolisch
Attys

United States Patent Office 2,890,901
Patented June 16, 1959

2,890,901

END THRUST BEARING SEAL

Leslie E. Martin, Tigard, Oreg., assignor to Sealco Manufacturing Inc., Portland, Oreg., a corporation of Oregon Application September 24, 1956, Serial No. 611,603

3 Claims. (Cl. 286—11)

This invention relates to end thrust seals for use between the opposed end faces of a pair of relatively rotatable members for sealing the space between the members.

End thrust seals are frequently installed between a pair of relatively rotatable members for the purpose of retaining grease, oil or other lubricant within the space between the members while excluding dust, water and other foreign matter. Commonly, seals of this type are constructed with a pair of seal elements connected to each other so as to prevent relative rotation of the seal elements but accommodate axial movement of one of the seal elements with respect to the other of the seal elements. The seal elements are secured for simultaneous rotation in order to prevent rupture of the usual diaphragm joining the peripheries of the elements. It is desirable that the seal elements be allowed to move axially of one another, since generally they are used with a pair of relatively rotatable supporting members which are capable of a certain amount of movement longitudinally of the axis of rotation of the supporting members. In addition to this longitudinal movement, the supporting members frequently are subject to a limited degree of movement laterally of the axis of rotation of the members. Because of the recurring axial movement of the supporting members and the occasional lateral movement of these members, it is quite important that end thrust seals employed with such supporting members be capable of withstanding a considerable amount of abuse while still permitting free axial movement of the seal elements.

Generally, it is an object of this invention to provide an improved seal having a pair of seal elements wherein the seal elements are keyed for rotation together as a unit, yet are freely movable axially of one another, and wherein axial movement of the elements is not affected appreciably by the wear and tear normally incident with the use of such seals.

While various constructions have been proposed in the art for locking together a pair of seal elements for simultaneous rotation, the constructions suggested have been inadequate in that the locking devices employed have tended to crumble and be upset by the peening action created within the seal by reason of the various parts within the seal striking each other. As a result, excessive play is introduced between the seal elements, and in some instances axial movement of the seal elements relative to each other is inhibited. It has been discovered that most, if not all, of these difficulties may be eliminated by incorporating within the seal mechanism motion transmitting elements having contacting surfaces which are inclined to the direction of the forces transmitted between the seal elements when one is urged to rotate relative to the other. Through the use of contacting surfaces which are inclined in this manner, motion is transmitted between the seal elements by reason of the contacting surfaces wedging against each other, rather than by striking each other, as is the case when two abutting surfaces are arranged perpendicular to the force transmitted between the surfaces.

The motion transmitting elements employed in this invention comprise a plurality of finger elements carried by one of the seal elements, and a plurality of complementary cup-shaped elements carried by the other of the seal elements, which are so arranged and spaced between the seal elements as to retain the elements in axial alignment with one another. The finger elements are provided with external surfaces which are inclined to the direction of the forces transmitted between the seal elements when one is urged to rotate relative to the other, and are adapted to be loosely fit into the cup-shaped elements, which are provided with internal surfaces generally corresponding to the external surfaces of the finger elements. Structure is included for rigidly supporting the finger elements and the cup-shaped elements.

It is a more specific object of this invention, therefore, to provide an improved end thrust seal having motion transmitting elements keying the seal elements for simultaneous rotation wherein the forces transmitted between the seal elements are transmitted through surfaces which are inclined to the direction of the forces so that the motion transmitting elements tend to wedge against each other; and to provide an end thrust seal of the type described which possesses great rigidity yet which is compact and economical to produce.

These and other objects and advantages are attained by the present invention, various novel features of which will become disclosed as the following description is read in conjunction with the accompanying drawings wherein.

Figure 1:
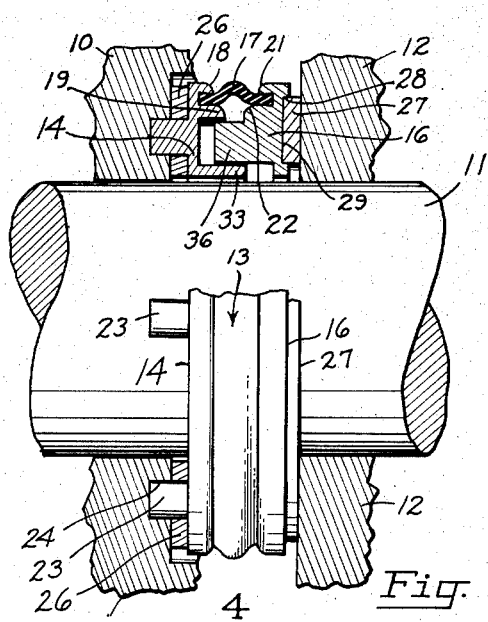
Fig. 1 is a side view, partly in section, of the seal of this invention showing the seal mounted between a stationary housing and a relatively rotatable shaft assembly.

Referring to Fig. 1, an embodiment of the seal of this invention is shown in connection with a stationary housing 10 and a shaft 11 having a fragment 12 secured to the shaft for rotation with the shaft. Shaft 11 extends through housing 10 and is mounted for relative rotation with respect to the housing. An end thrust seal, generally indicated at 13, is compressed between housing 10 and fragment 12, thereby sealing the shaft so that extraneous matter is prevented from entering the interior of the seal and any lubricant held by the seal is retained within the seal. Fragment 12 may be part of a wheel or other rotatable object, and for this reason may be subject to movement toward and away from housing 10, as well as some lateral movement transversely of shaft 11.

The seal 13 illustrated comprises in general a pair of axially spaced, annular plates referred to herein as attaching plate 14, and riding plate 16. A flexible diaphragm 17 made of suitable material such as leather, neoprene, or other synthetic material, extends between and connects adjacent peripheries of plates 14 and 16, defining thereby an intermediate chamber between the inner faces of plates 14 and 16. Diaphragm 17 is held on attaching plate 14 by means of a gripping flange 18 and an annular abutment flange 19 integrally formed in the plate and projecting inwardly therefrom; and, in a similar manner, the diaphragm is held on riding plate 16 by a gripping flange 21 and an annular abutment flange 22. In practice, the diaphragm may be assembled readily with attaching plate 14 and riding plate 16 by inserting the edges of the diaphragm between flanges 18 and 19, and 21 and 22, and subsequently rolling or peening the upper flanges downwardly against the abutment flanges so as to pinch the diaphragm in place. In this manner, a substantially fluid tight seal may be effected.

Extending outwardly from attaching plate 14 are a series of studs 23 integrally formed with the plate and circumferentially spaced about the outer surface of the plate. These studs extend into a complementary series of bores 24 formed in housing 10 so that plate 14 is fixed against relative rotational movement with respect to housing 10. A packing ring 26 is placed between the outer face of attaching plate 14 and the end face of housing 10 so as to prevent the movement of material around the outer face of plate 14. The packing ring 26 is provided with a series of holes to permit studs 23 to be inserted through the packing rings.

Figure 2:
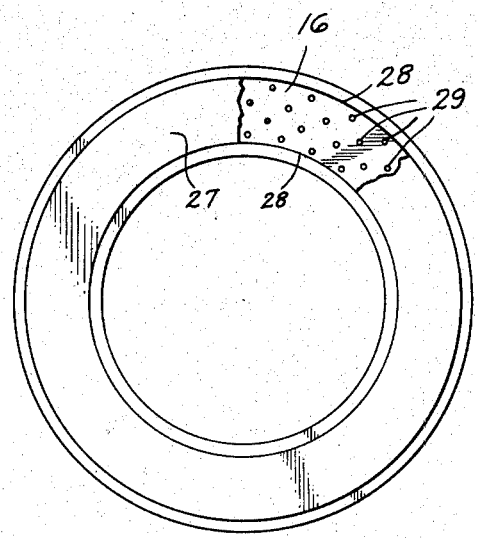
Fig. 2 is a view of one end of the seal in Fig. 1.

Riding plate 16 has fastened to its outer face a packing ring 27. Packing ring 27 fits into a shallow annular trough 28 made in the outer face of plate 16, the outer surface of packing ring 27 extending beyond the outer face of plate 16 so as to contact fragment 12. Packing ring 27 is nonrotatably secured to plate 16 as by cementing. Referring to Fig. 2, the base of annular trough 28 has projecting outwardly therefrom a series of pin projections 29 which grip into the packing ring and assist in securing the packing ring from rotation with respect to plate 16.

Projecting inwardly from the inner faces of plates 14 and 16 and circumferentially spaced about the inner faces are a series of spring seat projections 30 and 31. Coil springs 32 encircle opposite pairs of spring seat projections 30 and 31, these springs being compressed between the inner faces of plates 14 and 16 and normally urging them apart to a limit position determined by diaphragm 17 being fully extended. Normally when the seal is incorporated with a housing and shaft as shown in Fig. 1, plates 14 and 16 are pressed together to a certain extent and coil springs 32 serve to force packing rings 26 and 27 firmly against the end faces of housing 10 and fragment 12, respectively.

Power transmitting means are provided to nonrotatably secure attaching plate 14 to the riding plate 16. These power transmitting means are constructed so as to permit axial movement of the plates with respect to one another, to accommodate longitudinal movement of the shaft and its related fragment 12 relative to housing 10.

Figure 3:
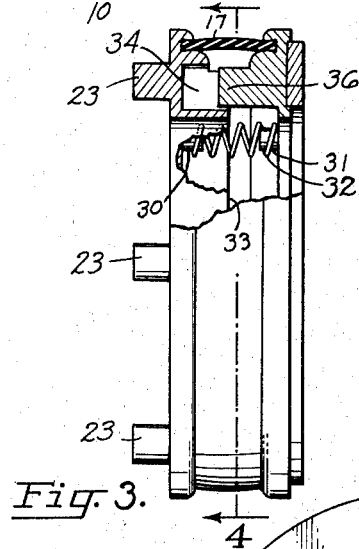
Fig. 3 is another side view, partly in section, of the seal in Fig. 1.
Figure 4:
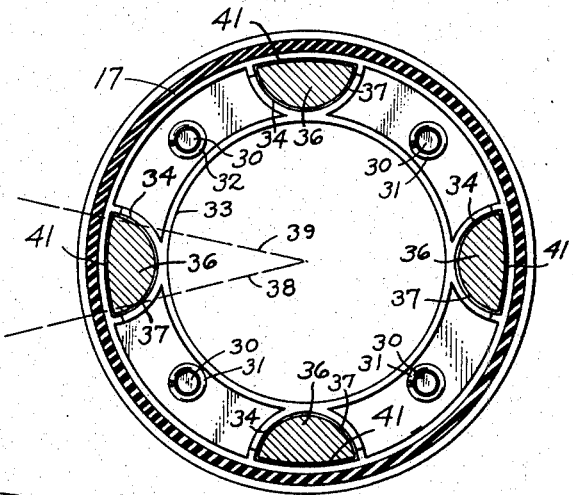
Fig. 4 is a transverse section along the line 4—4 of Fig. 3.
Figure 5:
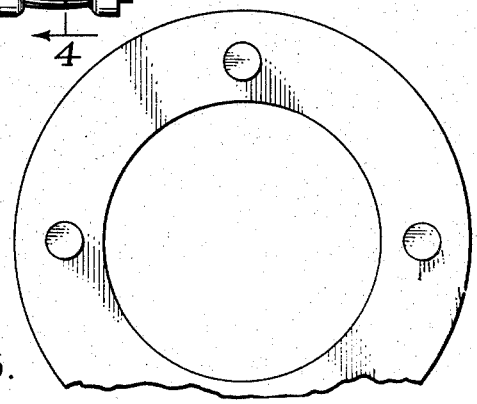
Fig. 5 is an end view of the other end of the seal in Fig. 1.

Referring to Figs. 1, 3, and 4, integrally formed with riding plate 16 and projecting inwardly from the plate into the chamber bounded by diaphragm 17 are a plurality of finger elements 36, each having a radially inner, convex, arcuate external surface indicated at 37. Finger elements 36 are spaced about plate 16 so as to alternate with spring seat projections 31. Integrally formed with attaching plate 14 and projecting inwardly toward plate 16 are a series of cup-shaped elements 34 having concave arcuate internal surfaces corresponding to the arcuate external surfaces of the finger elements. Attaching plate 14 also has a support ring 33 concentric with diaphragm 17 and carried by plate 14 radially inwardly of the cup-shaped elements. Cup-shaped elements 34 are spaced about plate 14 so as to alternate with spring seat projections 30, and slidably receive finger elements 36 when plates 14 and 16 are assembled together. As can best be seen in Fig. 3, the over-all inward projection length of finger elements 36 and cup-shaped elements 34 exceeds the width of the chamber defined by plate elements 14 and 16 and diaphragm 17 when the plate elements are axially spaced apart the maximum distance permitted by diaphragm 17. In this manner, engagement of the cup-shaped elements by the finger elements is assured at all times.

With reference to Fig. 4, each of the finger elements has a radially outer external surface indicated at 41. Surface 41 is of arcuate form, corresponding to the curvature of support flange 19. When plates 14 and 16 are pressed together against springs 32 so that fingers 36 lie beneath flange 19, the inner surface of flange 19 and surface 41 cooperate to form an additional means for retaining plate elements 14 and 16 in axial alignment.

Arcuate surfaces 41 and 37 of each finger element join each other to form two axially extending edges on either side of the finger element, that is, edges which extend parallel to the center axis of the bearing seal. The surfaces define lens-shaped cross-sections for the finger elements. Arcuate surface 37 curves between these two edges so that surface portions thereof between these two axially extending edges intercept radial lines projected from the center of the plate element, such as radial lines 38 and 39 in Fig. 4.

With reference to Fig. 4, it will be noted that the axially extending terminating edges of each cup-shaped element 34 are disposed inwardly slightly from the axially extending edges of a complementary finger element formed by the joint between arcuate surfaces 37 and 41. The terminating edges of each cup-shaped element extend axially directly adjacent the convex surface 37 of an associated finger element at points wherein the surface 37 of the finger element is inclined to radial lines projected from the axial center of the plate elements so as to intercept such radial lines. That is to say, the portions of a convex surface of a finger element which are directly adjacent the terminating edges of a cup-shaped element lie at an angle and not tangentially with respect to radial lines projected from the center of the plate elements. That portion of a surface 37 which is encompassed by a cup-shaped element curves in a continuous sweep throughout, and intercepts throughout such radial lines.

Cup-shaped elements 34 which are joined at their radially inner portions to support ring 33, have their radially outer portions connected to support flange 19. Thus elements 34 together with flange 19 form a series of pockets for the reception of finger elements 36. By supporting both the radially inner and outer portions of the cup-shaped members in the manner described, considerable structural strength may be realized.

I claim:

1. An end thrust seal mechanism comprising a pair of annular plate elements spaced apart to define an intermediate chamber, a flexible diaphragm joining said plate elements adjacent the peripheries of said plates and forming the peripheral margin of said chamber, and means interposed between the inner faces of said plate elements securing the plate elements against relative rotation but accommodating relative axial movement of said plate elements, said means comprising a plurality of finger elements equally circumferentially spaced about the inner face of one of said plate elements and projecting inwardly therefrom into said chamber, each of said finger elements being lens-shaped with radially inwardly and outwardly facing convex arcuate surfaces, the radially inwardly facing surface of each of the finger elements being on an arc of a circle of a smaller diameter than that of the radially outwardly facing surface, and a plurality of complementary cup-shaped elements equally circumferentially spaced about the inner face of the other of said plate elements and projecting inwardly therefrom into said chamber, each of said cup-shaped elements having a concave arcuate inner surface complementary to the convex surface of a finger element, said finger elements being slidably mounted within said cup-shaped elements and wedging within the latter when rotation of one of said plate elements urges it relative to said other of said plate elements.

2. An end thrust seal mechanism comprising a pair of annular plate elements spaced apart to define an intermediate chamber, a flexible diaphragm joining said plate elements adjacent the peripheries of said plates and forming the peripheral margin of said chamber, a plurality of finger elements equally circumferentially spaced about the inner face of one of said plate elements and projecting inwardly therefrom into said chamber, each of said finger elements being lens-shaped with radially inwardly and outwardly facing convex arcuate surfaces, the radially inwardly facing surface of each of the finger elements being on an arc of a circle of a smaller diameter than that of the radially outwardly facing surface, a plurality of complementary cup-shaped elements equally circumferentially spaced about the inner face of the other of said plate elements and projecting inwardly therefrom into said chamber, each of said cup-shaped elements having a concave arcuate inner surface complementary to the convex surface of a finger element, and a support ring concentric with said diaphragm carried by said other of said plate elements radially inwardly of said cup-shaped elements, said support ring projecting into said chamber coextensively with said cup-shaped elements and being connected to radially inward portions of said cup-shaped elements, said finger elements being slidably mounted within said cup-shaped elements and wedging within the latter when rotation of said one of said plate elements urges it relative to said other of said plate elements.

3. An end thrust seal mechanism comprising a pair of annular plate elements spaced apart to define an intermediate chamber, a flexible diaphragm joining said plate elements adjacent the peripheries of said plate elements and forming the peripheral margin of said chamber, the inner surface of said diaphragm being held against an annular flange projecting inwardly from the inner face of each of said plate elements, and means interposed between the inner faces of said plate elements securing the plate elements against relative rotation but accommodating relative axial movement of said plate elements, said means comprising a plurality of finger elements equally circumferentially spaced about the inner face of one of said plate elements and projecting inwardly therefrom into said chamber, each of said finger elements being lens-shaped and having radially inwardly and outwardly facing convex arcuate surfaces, the radially inwardly facing surface of each of the finger elements being on an arc of a circle of a smaller diameter than that of the radially outwardly facing surface, the radially outwardly facing surface having a curvature complementary to the curvature of the annular flange projecting from said other of said plate elements, a plurality of complementary cup-shaped elements equally circumferentially spaced about the inner face of the other of said plate elements and projecting inwardly therefrom into said chamber, said cup-shaped elements joining with the annular flange projecting from said other of said plate elements so as to form a pocket for the reception of said finger elements, said finger elements being slidably mounted within said cup-shaped elements and wedging within the latter when rotation of said one of said plate elements urges it relative to said other of said plate elements.

References Cited in the file of this patent
UNITED STATES PATENTS

| | | |
|---|---|---|
| 2,277,771 | McNab | Mar. 31, 1942 |
| 2,301,723 | Vedovell | Nov. 10, 1942 |
| 2,639,170 | Schick et al. | May 19, 1953 |
| 2,694,588 | Wooden | Nov. 16, 1954 |